Patented May 29, 1951

2,554,576

UNITED STATES PATENT OFFICE 2,554,576

UNSATURATED SULFONES

Edward F. Landau, Newark, and Ernest P. Irany, Cranford, N. J., assignors to Celanese Corporation of America, a corporation of Delaware No Drawing. Application April 1, 1948, Serial No. 18,484

1 Claim. (Cl. 260—607)

This invention relates to the preparation of organic sulfones and relates more particularly to the production of vinyl sulfones.

An object of this invention is the provision of an improved process for the production of organic sulfones containing a vinyl group attached to the sulfone linkage.

Another object of this invention is to provide an improved process for the production of vinyl sulfones whereby said vinyl sulfones may be obtained in improved yields.

Other objects of this invention will appear from the following detailed description.

Vinyl sulfones have been found to yield new and valuable modified polymers, for example, when copolymerized with other polymerizable compounds. However, the production of vinyl sulfones by methods heretofore known has not been entirely satisfactory from the standpoints of reaction conditions and yields, which made the cost of the vinyl sulfones too great for use in the production of the modified copolymers. Accordingly, the development of an efficient and economical process for the production of vinyl sulfones would render the production of said modified copolymers commercially feasible.

We have now found that vinyl sulfones of the formula R—SO$_2$—CH=CH$_2$ may be obtained efficiently and economically by a novel process comprising a series or combination of steps whereby a mercaptan of the formula R—SH is reacted with ethylene chlorhydrin to form a 2-hydroxy-ethyl sulfide and the latter reacted with hydrochloric acid so that the hydroxy group is replaced by a chlorine atom. The 2-chloro-ethyl sulfide derivative thus obtained is oxidized to the sulfone form, and the 2-chloro-ethyl sulfone then reacted with sodium hydroxide whereby hydrogen chloride is removed and a vinyl sulfone of the formula R—SO$_2$—CH=CH$_2$ is formed.

In the general formula above, the substituent R is a stable monovalent group linked by a carbon atom to the sulfur atom and may be an alkyl group such as, for example, an ethyl, a propyl, a butyl, an amyl, a decyl, a dodecyl or an octadecyl group, a cyclohexyl group, an aromatic group, such as, for example, a phenyl or a naphthyl group or a nuclearly substituted phenyl or naphthyl group containing a nuclear halogen or an alkyl group, for example, or an alkyl-substituted aryl group such as a benzyl or phenyl-ethyl group. Accordingly, by our novel process there may be readily obtained vinyl sulfones such as propyl vinyl sulfone, butyl vinyl sulfone, amyl vinyl sulfone, decyl vinyl sulfone, dodecyl vinyl sulfone, octadecyl vinyl sulfone, cyclohexyl vinyl sulfone, phenyl vinyl sulfone, naphthyl vinyl sulfone, tolyl vinyl sulfone, chlor-phenyl vinyl sulfone, benzyl vinyl sulfone and 2-phenyl-ethyl vinyl sulfone.

In lieu of employing mercaptans in a substantially purified form, crude mercaptans such as those obtainable from petroleum sources may also be employed. These crude mercaptans are alkyl phenyl mercaptans and may be obtained as a by-product during petroleum refining processes. These mercaptans may be separated from the petroleum hydrocarbons as lead salts which on treatment with acid regenerates the mercaptans which may be fractionated by vacuum distillation. When aromatic phosphate esters are prepared by reacting a "cresylic" acid containing a mixture of aromatic mercaptans such as thiophenols, thiocresols, thioxylenols and the like with phosphorous oxychloride, for example, the unreacted aromatic mercaptan compounds present may be removed as a forerun in the distillation of the resulting crude phosphate esters.

The reaction of ethylene chlorhydrin with the desired mercaptan is usually effected in solution in water or in a suitable inert organic solvent such as, for example, ethyl alcohol, methyl alcohol or dioxane at reflux temperature, the mercaptan preferably being in the form of the alkali metal salt. The mercaptan may be converted to the alkali metal or alkaline earth metal salt by adding the mercaptan to say, an alcoholic solution of sodium or potassium hydroxide. The ethylene chlorhydrin is then reacted with the alkali mercaptan in alcoholic solution in which it is formed by slowly adding a slight excess of the ethylene chlorhydrin to said alcoholic solution, with stirring, while the latter is maintained under reflux. Reflux is continued with stirring for 1 to 5 hours to ensure complete reaction. The solvent alcohol is then distilled from the reaction mixture, the latter then poured into water and the bulk of the 2-hydroxy-ethyl sulfide derivative formed separates as an oily layer from the aqueous layer. The aqueous layer is extracted with benzene to remove any of the 2-hydroxy-ethyl sulfide present therein. The benzene solution of 2-hydroxy-ethyl sulfide derivative is combined with the previously separated oily layer and the mixture then washed with saturated aqueous calcium chloride solution. The mixture of the 2-hydroxy-ethyl sulfide with water and benzene is dried over anhydrous magnesium sulfate, distilled free of benzene and then finally distilled under vacuum in order to purify the 2-hydroxy-ethyl sulfide.

The conversion of the 2-hydroxy-ethyl sulfide derivative to the corresponding 2-chloro-ethyl sulfide compound is effected quite economically and conveniently by reacting the 2-hydroxy-ethyl sulfide derivative with 1 to 5 mols of concentrated aqueous hydrochloric acid at reflux temperature, i. e. 110 to 120° C. and atmospheric pressure for 1 to 5 hours with stirring. The 2-chloro-ethyl sulfide compound is formed as the reaction product. It is separated, suitably dried and then preferably purified by distillation under vacuum.

The conversion of the 2-hydroxy-ethyl sulfide to the corresponding 2-chloro-ethyl sulfide at normal atmospheric pressure employing aqueous concentrated hydrochloric acid is quite surprising and a definite advance in the art since such conversion is normally to be expected to take place only under conditions of high temperature and pressure.

The oxidation of the 2-chloro-ethyl sulfide compound thus formed to the corresponding 2-chloro-ethyl sulfone may be effected conveniently by reacting the 2-chloro-ethyl sulfide in solution in a suitable solvent with an oxidizing agent, such as hydrogen peroxide, sodium dichromate, or chromic acid under reflux at a temperature of 90 to 120° C. Thus, the oxidation may be effected by heating the solution of 2-chloro-ethyl sulfide in acetic acid to about 90 to 120° C. and, while stirring, slowly adding a slight excess of a 26% by weight aqueous solution of hydrogen peroxide thereto. After the addition of the hydrogen peroxide is completed, the reaction mixture is maintained under reflux for 1 to 5 hours to complete the oxidation. Separation of the 2-chloro-ethyl sulfone thus formed is effected by pouring the reaction mixture, after cooling, into cold water.

The dehydrohalogenation or removal of hydrogen chloride from the 2-chloro-ethyl group of the sulfone is effected, surprisingly enough, in an economical and expeditious manner, by heating the latter, while stirring, in a 5 to 40% by weight aqueous solution of a suitable alkali, such as sodium hydroxide. The temperature of the reaction mixture may vary from 20 to 80° C., but is preferably maintained at from 30 to 40° C. and the reaction is continued for from 1 to 5 hours. Upon completion of the reaction, the resulting mixture is diluted with water and excess alkali neutralized with dilute hydrochloric acid. The vinyl sulfone formed is then filtered off and dried. It may be further purified by recrystallization from a suitable solvent.

Where the mercaptan originally reacted as thiophenol, for example, the final product obtained is phenyl vinyl sulfone. Similarly, where the mercaptan reacted is ethyl mercaptan, the final product will be ethyl vinyl sulfone. The vinyl sulfones produced in accordance with our novel process are obtained in excellent purity and yield and, upon being co-polymerized with other polymerizable compounds, yield new and valuable copolymers.

In order further to illustrate our invention but without being limited thereto, the following examples are given:

*Example I*

472 parts by weight of potassium hydroxide are gradually added to 2000 parts by weight of ethyl alcohol. Water may also be used as the solvent in place of the ethyl alcohol. The temperature rises to a reflux temperature, i. e. about 80° C., due to the heat of solution. 880 parts by weight of thiophenol are added to the alcoholic potassium hydroxide solution. When the addition is completed, 640 parts by weight of ethylene chlorhydrin are added slowly over the course of about 2 to 5 hours. The mixture is maintained at reflux temperature during this addition. The reaction mixture is refluxed with stirring for about 2.5 hours to ensure completeness of reaction. The ethyl alcohol is then distilled off and the mixture remaining in the still then poured into 5000 parts by weight of cold water. The 2-hydroxy-ethyl phenyl sulfide separates as an oily layer which is removed from the aqueous layer. The aqueous layer may be extracted with benzene to remove any residual 2-hydroxy-ethyl phenyl sulfide. The oily layer and the benzene solution of 2-hydroxy-ethyl phenyl sulfide are combined, washed with a saturated aqueous solution of calcium chloride and, finally, dried over anhydrous magnesium sulfate. The dried oil is distilled to free it of benzene and again distilled under about 2 mm. pressure. The 2-hydroxy-ethyl phenyl sulfide distills over at 116 to 118° C. under this pressure.

154 parts by weight of the purified 2-hydroxy-ethyl phenyl sulfide are then added to 200 parts by weight of concentrated 37% hydrochloric acid (sp. grav. 1.19) and the mixture heated under reflux with stirring at a temperature of 110 to 120° C. for 3 hours. At the completion of the reaction the 2-chloro-ethyl phenyl sulfide formed is separated from the aqueous phase, dried and then distilled under a pressure of about 15 mm., the product distilling over at a temperature of about 129 to 130° C.

86 parts by weight of 2-chloro-ethyl phenyl sulfide are dissolved in 500 parts by weight of glacial acetic acid and the solution heated to 95° C. with stirring. 125 parts by weight of 26% aqueous hydrogen peroxide are slowly added to the acetic acid solution over the course of one hour while the solution is maintained under reflux. Heating is continued at 95 to 100° C. for an additional 4 hours and, after cooling the reaction mixture, the latter is poured into 3000 parts by weight of cold water. The 2-chloro-ethyl-phenyl sulfone formed crystallizes out, and is filtered off and then dried under vacuum.

172 parts by weight of the dried 2-chloro-ethyl phenyl sulfone are added to about 350 parts by weight of 20% aqueous sodium hydroxide and the mixture stirred rapidly for about 20 minutes while maintaining the temperature between 34 and 39° C. The 2-chloro-ethyl phenyl sulfone remains as a slurry in the sodium hydroxide solution at the beginning of the reaction. As the reaction proceeds, however, the solid phase gradually melts and becomes suspended in the form of a finely-divided oil. At the completion of the dehydrochlorination reaction the finely-divided oily droplets solidify. The reaction mixture is diluted with 300 parts by weight of water and excess alkali neutralized with dilute aqueous hydrochloric acid. The solidified phenyl vinyl sulfone is then filtered off and dried. Further purification may be effected by dissolving the phenyl vinyl sulfone in acetic acid and recrystallizing. Any traces of acetic acid may be removed by washing the phenyl vinyl sulfone with 1% aqueous solution of potassium carbonate. The overall yield of phenyl vinyl sulfone obtained by our novel process is 75% of theory, based on the thiophenol.

*Example II*

40 parts by weight of lauryl mercaptan are added to a solution of 17 parts by weight of potassium hydroxide in 136 parts by weight of ethyl alcohol. 20 parts by weight of ethylene chlorhydrin are added to the mercaptide solution at reflux temperature. The reactants are refluxed for 2½ hours. After standing 48 hours, 100 parts by weight of ethyl alcohol are removed by distillation and the batch mixed with 400 parts by weight of water. The oil which separates is isolated by benzene extraction. After washing with salt water, the benzene extracts are dried and the solvent distilled off. 45.2 parts by weight of crude 2-hydroxy-ethyl lauryl sulfide are obtained and the latter chlorinated as follows. The 2-hydroxy-ethyl lauryl sulfide and about 115 parts by weight of concentrated hydrochloric acid are heated at reflux, with stirring for 3 hours. The oil phase is isolated by benzene extraction. After water washing and drying the solvent is removed. The residue of crude 2-chloro-ethyl lauryl sulfide obtained in an amount of 45.8 parts by weight which is equivalent to a 90% yield is then oxidized. The 2-chloro-ethyl lauryl sulfide is oxidized in solution in about 250 parts by weight of glacial acetic acid with 82.5 parts by weight of 30% $H_2O_2$ at reflux temperature for 3½ hours. The oxidation solution is poured into 1000 parts by weight of cold water. The product, a creamy white solid, is isolated by filtration and has a melting point of 45 to 46° C. Recrystallization raises the melting point to 54 to 55° C. and an 83% yield is obtained. The 2-chloro-ethyl lauryl sulfone obtained is slurried with 102 parts by weight of aqueous 20% sodium hydroxide at 30 to 50° C. At the end of 2 hours of stirring, the reaction mixture is neutralized and cooled. The solid product is filtered off, washed and dried. The product is recrystallized from 320 parts by weight of ethyl alcohol. A yield 27 parts by weight of lauryl vinyl sulfone is obtained. The yield based on the starting material, lauryl mercaptan, is 52%.

*Example III*

150 parts by weight of potassium hydroxide are added to 240 parts by weight of ethyl alcohol. The temperature is raised to reflux and 250 parts by weight of benzyl mercaptan are added. When the addition is completed 170 parts by weight of ethylene chlorhydrin are slowly added over a period of three hours. The mixture is maintained at reflux during this addition and for an additional three hours. The alcohol is distilled off and the mixture remaining in the still is then poured into 1000 parts by weight of cold water. The 2-hydroxy-ethyl benzyl sulfide formed separates as an oil and is isolated. 132 parts by weight of the 2-hydroxy-ethyl benzyl sulfide is added to about 200 parts by weight of concentrated aqueous hydrochloric acid and the mixture heated under reflux with stirring at a temperature of 110 to 120° C. for three hours. At the completion of the reaction the 2-chloro-ethyl benzyl sulfide formed is separated from the aqueous phase. The product obtained from this reaction is dissolved in about 475 parts by weight of glacial acetic acid and heated to 100° C. with stirring. 200 parts by weight of 30% aqueous hydrogen peroxide are slowly added over the course of one hour while the solution is maintained at reflux. Heating is continued at 95 to 100° C. for 2 hours. After cooling, the reaction mixture is poured into 2,000 parts by weight of cold water. The 2-chloro-ethyl benzyl sulfone crystallizes out, and is filtered off and recrystallized from ethyl alcohol. 150 parts by weight of dried 2-chloro-ethyl benzyl sulfone are added to 300 parts by weight of 20% aqueous sodium hydroxide and the mixture stirred rapidly for 40 minutes, while maintaining the temperature between 35 to 45° C. The mixture is poured in 150 parts by weight of water and neutralized with dilute hydrochloric acid. The solidified benzyl vinyl sulfone is filtered off and dried. The overall yield is 60% of theoretical based on benzyl mercaptan.

*Example IV*

166 parts by weight of a mixture of crude "cresyl" mercaptans, obtained as a by-product of the purification of petroleum, is dissolved in about 500 parts by weight of 20% aqueous sodium hydroxide and then 100 parts by weight of ethylene chlorhydrin are slowly added while stirring. The mixture is heated to maintain it under reflux. After the addition of the ethylene chlorhydrin is completed the reaction mixture is heated under reflux for 3 hours more. The water-insoluble product formed, 2-hydroxy-ethyl cresylic sulfide, is then isolated.

The crude 2-hydroxy-ethyl cresylic sulfide is heated at a reflux temperature of 110 to 120° C. with about 250 parts by weight of 37% by weight aqueous hydrochloric acid for about 3 hours. The hydroxy group is replaced by a chlorine and is converted to the water insoluble 2-chloro-ethyl cresylic sulfide. The latter is isolated and may be further purified by vacuum distillation.

220 parts by weight of sodium bichromate are dissolved in a sufficient amount of water to make a 15% by weight aqueous solution, the distilled 2-chloro-ethyl cresylic sulfide is added to the solution obtained and heated to 50 C. 800 parts by weight of a 50% by weight aqueous solution of sulfuric acid are then slowly added. The temperature gradually increases to about 95° C. and, when the addition of the sulfuric acid is complete, the mixture is maintained at this temperature for 2 hours more. The reaction mixture is then cooled and the water-insoluble 2-chloro-ethyl cresylic sulfide is isolated.

The 2-chloro-ethyl cresylic sulfone is introduced into 350 parts by weight of a 20% by weight aqueous solution of sodium hydroxide and the mixture then stirred at 45 to 50° C. for 2 hours. Excess alkali is then neutralized by the addition of dilute aqueous hydrochloric acid and the crude cresylic vinyl sulfone formed isolated and then purified by vacuum distillation at a pressure of 3 mm. of mercury. The major portion of the cresylic vinyl sulfone distills over between 128 and 148° C. The overall yield of cresylic vinyl sulfone obtained by our process is 53% of theory.

It is to be understood that the foregoing detailed description is given merely by way of illustration and that many variations may be made therein without departing from the spirit of our invention.

Having described our invention, when we desire to secure by Letters Patent is:

In a process for the production of phenyl vinyl sulfone by dissolving thiophenol in an alcoholic potassium hydroxide solution, adding an excess of ethylene chlorhydrin thereto, reacting the mixture at reflux temperature with stirring for 1 to 5 hours whereby 2-hydroxy-ethyl phenyl sulfide is formed, distilling off the ethyl alcohol, adding the remaining mixture to cold water, removing the oily layer of 2-hydroxy-ethyl phenyl sulfide and extracting the aqueous layer with benzene to remove any 2-hydroxy-ethyl phenyl sulfide therein, combining the oily layer and benzene extract, washing with aqueous calcium chloride, drying and distilling the dried liquid to separate 2-hydroxy-ethyl phenyl sulfide therefrom, reacting the sulfide with concentrated aqueous hydrochloric acid at reflux temperature and at atmospheric pressure for 1 to 5 hours with stirring whereby the hydroxy group is replaced by chlorine, purifying the 2-chloro-ethyl phenyl sulfide by fractional distillation, oxidizing the 2-chloro-ethyl phenyl sulfide to the sulfone form by reacting an acetic acid solution of said sulfide with aqueous 26% hydrogen peroxide at reflux temperature for 1 to 5 hours, separating the 2-chloro-ethyl phenyl sulfone obtained by pouring the reaction mixture into water, filtering the crystals formed and drying the same, the steps which comprise adding the 2-chloro-ethyl phenyl sulfone to a 20% by weight aqueous solution of sodium hydroxide, and reacting the resulting mixture with stirring at a temperature of 34 to 39° C. so as to cause hydrogen chloride to be removed and phenyl vinyl sulfone to be formed.

EDWARD F. LANDAU.
ERNEST P. IRANY.

REFERENCES CITED

The following references are of record in the file of this patent:

Baddeley: "Jour. Chem. Soc." (London) 1933, pages 46–8.
Rothstein: "Jour. Chem. Soc." (London) 1934, pages 684–7.
Kretov: "Chemical Abstracts," vol. 32, page 518 (1938).
Nenitzescu: "Chemical Abstracts," vol. 29, page 3979 (1935).
Whitner: "Chemical Abstracts," vol. 15, page 1714 (1921).
Steinkopf: "Chemical Abstracts," vol. 14, page 3419 (1920).
Fieser et al.: "Organic Chemistry," page 58, D. C. Heath & Co., Boston (1944).